M. J. TODD.
DUMP WAGON.
APPLICATION FILED APR. 17, 1911.
1,020,524.
Patented Mar. 19, 1912.
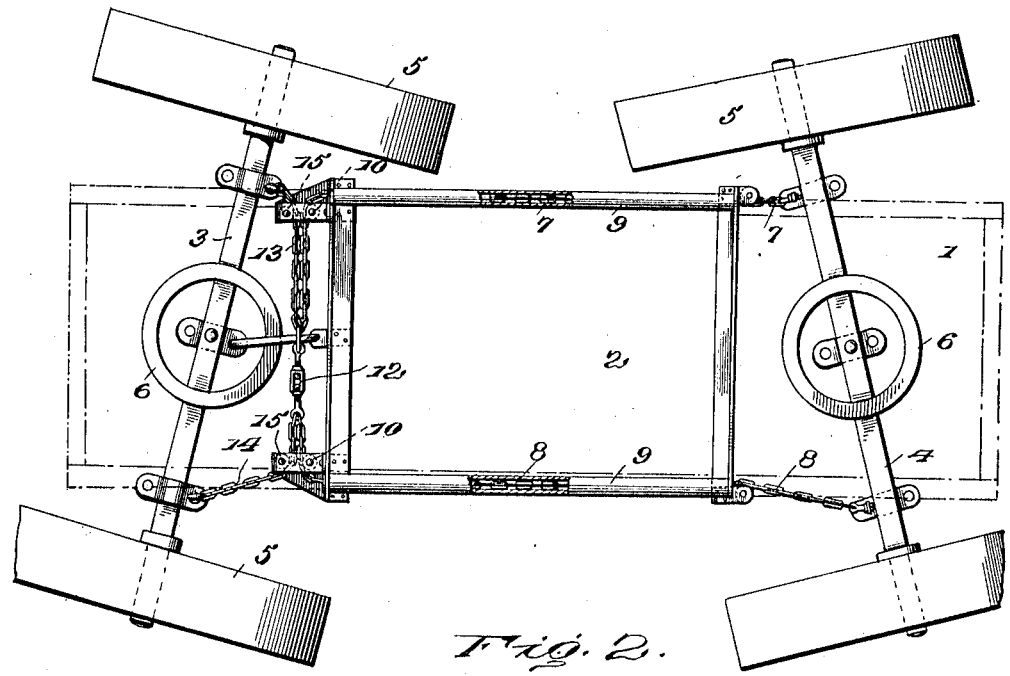
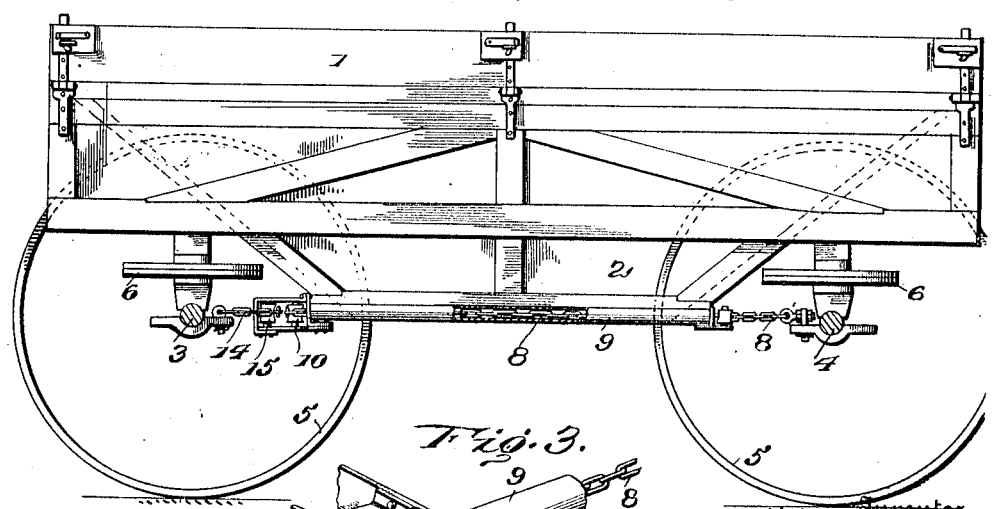

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

DUMP-WAGON.

1,020,524.  Specification of Letters Patent.  Patented Mar. 19, 1912.

Application filed April 17, 1911.  Serial No. 621,525.

*To all whom it may concern:*

Be it known that I, MARQUIS J. TODD, of Buffalo, in the county of Erie and State of New York, have invented certain new and useful Improvements in Dump-Wagons; and I do hereby declare the following to be a full, clear, and exact description of the invention, such as will enable others skilled in the art to which it appertains to make and use the same.

The primary object of this invention is to reduce the strain on reaches and obviate the end thrust on the pivots of the two centrally pivoted axles of a dump-wagon, and so arrange the reaches that they will not interfere with the free discharge of the contents of the wagon.

The invention will be hereinafter fully set forth and particularly pointed out in the claims.

In the accompanying drawings, Figure 1 is a plan view of a dump wagon constructed in accordance with my present invention. Fig. 2 is a side elevation thereof. Fig. 3 is an enlarged detail.

Referring to the drawings, 1 designates the body of the wagon which is provided with a hopper-like bottom 2, the opening in which may be closed by any suitable or ordinary swinging door or doors (not shown), such hopper-like bottom being between the end axles 3 and 4. On these end axles are secured the carrying wheels 5, and each axle is pivotally connected to the body by a fifth wheel 6.

The reaches are flexible, and are preferably composed wholly of chains. They comprise two sets, one consisting of chains 7 and 8 which are connected to one of the axles on opposite sides of its pivot and extended through guides 9, which are shown in the form of pipes extending along the bottom of the opposite longitudinal sides of the wagon bottom, and these chains are then extended transversely of the body, adjacent the other axle, and engage with opposite vertically disposed grooved rollers 10, located adjacent to opposite ends of the guides. The transversely extended portions of these two chains are connected together, preferably by means of an ordinary turnbuckle 12. The complementary portions of the reaches comprise another set of relatively short chains 13 and 14 which are connected to the other axle on opposite sides of its pivot and are also carried transversely of the wagon body, being caused to engage opposite vertically disposed rollers 15, which are adjacent to the rollers 10 and approximately in line with the connections of the chains to the axles. These chains 13 and 14 are shown as also connected by the turn buckle 12. The result of this construction and arrangement will best be understood by reference to Fig. 1, which shows the axles and wheels in the positions they occupy when the vehicle is traveling on a curve.

Any forward movement of either axle will be communicated to the diagonally opposite end of the other axle, and a direct pull is exerted by reason of the direct line of connection of the chains to the axles. By extending these reach chains along the opposite parallel sides of the bottom and thence transversely of the frame beyond one end of the bottom, the outlet from the latter is left unobstructed.

It will be observed, first, that the chains which connect the two axles are wholly out of the way and will not in the least interfere with the discharge of the contents of the wagon. It will also be noted that each of the centrally pivoted axles is connected to the diagonally opposite end of the other axle and also to the corresponding end of such latter axle. It is obvious that the flexible reach connection need not necessarily be composed entirely of chains, but I prefer to so form them.

I claim as my invention:—

1. A wagon having, in combination, two pivoted axles and carrying wheels thereon, a body, flexible cross reaches connected to the two axles and extended in substantial parallelism with the sides of said body and transversely thereof at a point near one of the axles, such flexible reaches being connected to both axles at points on opposite sides of the pivots thereof, and guides for the reaches for directing the latter on substantially straight lines adjacent to the axles.

2. A wagon having, in combination, two pivoted axles and carrying wheels thereon, a body, flexible cross reaches connected to both of the axles and extended in parallelism with the sides of said body and rollers carried by the body and with which the reaches engage on opposite sides of the body, said rollers being approximately in line with the connections of the reaches with the axles.

3. A wagon having, in combination, two pivoted axles and carrying wheels thereon, a body having opposite parallel portions, guides extending along said portions, reach chains carried by said guides and connected to both the axles on opposite sides of the pivots thereof and extended transversely of the body, and rollers carried by the body with which said chains engage at the points where they are extended transversely of the body, said rollers being approximately in line with the connections of the chains with the axles.

4. A wagon having, in combination, two pivoted axles and carrying wheels thereon, a body, chains connected to one of the axles on opposite sides of the pivot thereof and extended parallel with the sides of said body, and thence transversely of the body, said chains being connected together, opposite vertically disposed rollers with which said chains engage, said rollers being located at one end of each side of the body, said chains extending transversely of the body and connected together, a second set of chains connected to the other axle on opposite sides of the pivot thereof and extended transversely of the body, and connected to the first mentioned chains, and a second set of opposite vertically disposed rollers with which said second chains engage, said latter rollers being located adjacent to the first mentioned rollers.

In testimony whereof, I have signed this specification in the presence of two subscribing witnesses.

MARQUIS J. TODD.

Witnesses:
FRANCIS S. MAGUIRE,
JOHN A. MURPHY.

---

Copies of this patent may be obtained for five cents each, by addressing the "Commissioner of Patents, Washington, D. C."